United States Patent [19]

Blackley

[11] 3,759,913

[45] Sept. 18, 1973

[54] POLYIMIDE POLYMERS OF BENZOPHENONE TETRACARBOXYLIC DIANHYDRIDES AND SATURATED ALIPHATIC DIAMINES

[75] Inventor: William D. Blackley, Afton, Minn.

[73] Assignee: Minnesota Mining and Manufacturing Company, Saint Paul, Minn.

[22] Filed: Sept. 11, 1972

[21] Appl. No.: 287,858

Related U.S. Application Data

[63] Continuation-in-part of Ser. No. 2,644, Jan. 13, 1970, abandoned.

[52] U.S. Cl. ... 260/33.4 P, 117/128.4, 117/138.8 N, 117/161 P, 161/167, 161/197, 260/33.6 R, 260/33.8 R, 260/65, 260/78 TF
[51] Int. Cl. ............................................ C08g 20/32
[58] Field of Search .................. 260/33.4 P, 47 CP, 260/65, 78 TF

[56] References Cited
UNITED STATES PATENTS

| | | | |
|---|---|---|---|
| 3,190,856 | 6/1965 | Lavin et al. | 260/65 |
| 3,440,196 | 4/1969 | Boldebuck et al. | 260/29.2 |
| 3,448,068 | 6/1969 | Holub et al. | 260/29.2 |
| 3,505,168 | 4/1970 | Dunphy et al. | 161/227 |
| 3,551,200 | 12/1970 | Stivers | 117/232 |

*Primary Examiner*—William H. Short
*Assistant Examiner*—L. L. Lee
*Attorney*—Alexander, Sell, Steldt & Delahunt

[57] ABSTRACT

The invention comprises solid, tack-free, thermosetting linear polyimides of benzophenone tetracarboxylic dianhydride and a saturated aliphatic diamine having from three to 12 carbon atoms, containing not more than a 2% excess of dianhydride or diamine over the amount needed to form the linear polyimide. The adhesives of the present invention have softening points between 150° C. and 300° C., inherent viscosities of about 0.1 and 2.0 as measured from a 0.5% solution of polyimide in m-cresol at 25° C. and substantially complete solubilities in m-cresol at 25° C. in the ratio of 10% by weight of polymer to 90% by weight of solvent, said polyimides releasing not more than 1% by weight of volatiles upon being heated for a period of 10 hours at 200° C. and thereby rendered thermally set.

8 Claims, No Drawings

POLYIMIDE POLYMERS OF BENZOPHENONE TETRACARBOXYLIC DIANHYDRIDES AND SATURATED ALIPHATIC DIAMINES

CROSS REFERENCE TO RELATED APPLICATION

This is a continuation-in-part of copending application Ser. No. 2,644 filed Jan. 13, 1970 and now abandoned.

SUMMARY OF THE INVENTION

This invention relates to linear, fusible polyimides which have relatively low softening points, are soluble and easily processable and are thermosetting. The fusible polymers of the invention are highly useful as adhesives. They adhere easily and tenaciously to surfaces such as metals and polymers (e.g., polyimides) without application of high pressures and temperatures over extended time periods. When thermoset they adhere well to such surfaces and have excellent resistance to heat.

BACKGROUND OF THE INVENTION

Polyamide acids which can be reacted to form polyimides are well known to the art and have been used for laminating polyimide films or metals to a variety of substrates, particularly in the manufacture of articles which are expected to be subjected to relatively high temperatures over considerable periods of time. For example, metals may be bonded to metals, organic polymer films to metals, films to films, films to glass or ceramics, films to organic resins, etc.

Normally, polyamide acid polymers are made by reacting a tetracarboxylic dianhydride or tetracarboxylic acid with a diamine and the polyamide acids are then further reacted to form linear polyimide structures. Recently, certain polyimides which are alleged to be cross-linkable have been disclosed. For example, U.S. Pat. No. 3,416,994 teaches that polyimides having recurring aromatic keto groups and containing at least a 15% (and preferably much greater) molar excess of diamine are cross-linkable and can be used as adhesives. However, there are several disadvantages with such polyimide adhesives. Because the final cross-linked polyimide structure is infusible and incapable of adhering to surfaces, it is necessary to place the adhesive in contact with the surfaces to be adhered while it is still in a fusible and linear form, such as the polyamic acid. However, the material in the polyamic acid state has a high volatile content (actual volatiles from the solvent therein and potential volatiles from the water released in imidization of the linear chains and in the cross-linking reaction). Some, but not all, of the solvent volatiles can be removed by a mild heat cycle of long duration. If an attempt is made to remove all of the solvent, higher temperatures are required which result in both imidization and cross-linking reactions.

Heating the partially dried polyamic acid between surfaces to be adhered results in blistering and poor adhesion due to the escape of the volatiles, especially if the surfaces are relatively impervious. Although this can be reduced by the use of high pressures and gradually increasing temperatures over a long period of time, such measures are unacceptable or at least very undesirable in modern production lines. Furthermore, such prior art polymers cannot be used conveniently at any stage between the polyamide acid (i.e., polyamic acid) state and the cross-linked polyimide state to adhere surfaces, since imidization in the linear chains and cross-linking appears to occur simultaneously. Similarly, the more widely known prior art linear aromatic polyamide acid-polyimides cannot be used as adhesives conveniently at any stage from the polyamide acid through the final polyimide stage. As polyimides, these linear prior art materials have very high softening points (and therefore require unduly high temperatures in order to be bonded at all) and are effectively infusible (in that they degrade generally below their softening temperatures). Prior to the polyimide stage, they contain excess volatiles. Thus, either the problem of excess volatiles or the problem of infusibility, or both, are present in the materials taught by the prior art at all times. As will be shown, the polymers of the present invention have none of these disadvantages and provide, for the first time, easily used, strongly adhering polyimide adhesives.

In accordance with the present invention a solid, tack-free polymer is provided which comprises a linear, thermosetable polyimide of benzophenone tetracarboxylic dianhydride and a saturated aliphatic diamine having from three to 12 carbon atoms, containing not more than a 2% excess of either the dianhydride or the diamine over the amount needed to form the linear polyimides. Preferably not more than a 1% stoichiometric excess of the diamine nor more than 0.5% excess of the dianhydride is used in preparing the polyimides (and consequently the polyimide contains from a 1% excess of the diamine to a 0.5% excess of the dianhydride) since it is in this range that the most stable, controllable systems according to the invention are prepared. Preferably also the diamine precursors contain from four to 9 carbon atoms for the best balance of properties in the polyimide products. These polyimides ordinarily have an inherent viscosity between 0.1 and 2.0, as measured from a 0.5% solution of polyimide in m-cresol at 25° C., (although they can have inherent viscosities of 4 or higher), a softening point between 150° C. and about 300° C. (as determined by differential thermal analysis in an atmosphere of helium at 740 mm. pressure at a temperature rise of 30° C./minute), are substantially completely soluble in m-cresol at 25° C. in the ratio of 10% by weight of polyimide at 90% by weight of solvent. Additionally, these polyimides do not release more than 1% by weight of volatiles upon being heated for a period of 10 hours at 200° C. and thereby rendered thermally set. Such volatiles as are in the linear thermosetable polyimides of the invention under ambient conditions (less than 1%) are apparently largely absorbed water. Thus it is possible to dry them using infrared heaters and forced air heat guns to an essentially volatile-free state and then allow them to return to equilibrium with ambient conditions of temperature and humidity (thereby regaining essentially the same level of volatiles as before drying) without changing their properties, such as thermosetability, solubility, softening point, etc. Such drying is, in fact, often necessary in using the linear polyimides as adhesives, particularly when the materials to be bonded are impervious or nearly so.

These polyimides have the advantage that they can be kept in the linear polymeric structure after being dried (for example, in film form) for several months or until needed for a particular bonding application. Permanent bonding is then easily and quickly accomplished by heating the polyimide film to its softening point and exerting only a moderate pressure on the adhesive during bonding. Additionally, these adhesives do not blister during bonding and have high adhesion and high thermal stability after the bond is thermoset. Heretofore such storage of polyimide adhesive films and subsequent bonding was not possible to such an extent as that achieved by the adhesives of the present invention.

Thus, these linear polyimides are easily processable as adhesives, heat-bondable, fusible, thermosetable, have high peel adhesion and high temperature stability, and do not evolve any large quantities of volatile solvents or water or other products of condensation during the bonding operation.

The linear polyimides of the invention can be used as such or can be further heated to thermally set them. They are also useful as primers for polyimide films (such as Kapton), as an overcoating for polyimide-insulated wire (the wire to be thereafter wound on cores, for example, and then heated to fuse the linear polyimide of the present invention but not the wire insulation). Similarly the linear polyimides can be used to adhere polyimide film (again such as Kapton) to copper film, this laminate being useful in the preparation of integrated circuits. Also they can be used to adhere and/or insulate metal motor core pieces. Another form in which the linear polyimides can be used is a dry, heat processable powder, e.g., in adhesive, molding and casting uses.

More particularly, these linear polyimides, which are often used in film form as adhesives, have the following properties:

1. solubility - thus allowing initial coating from solvent and enhancing adhesion. The solubility is indicative of the linearity of the polyimide.
2. fusibility below the degradation point - (this being necessary to obtain adhesion to the substrate) and moderate softening point (this allows fabrication and bonding at temperatures which are easily attained and controlled in production). Fusibility refers to the ability of a polymer to soften, unite or blend with and bond to another surface (conveniently evaluated by noting the ability of two surfaces of the same polyimide to bond together) under normal atmospheric conditions.
3. relatively high molecular weight-thus providing good bond strength.
4. thermosetability - thermosetting insures permanence of the bond and greatly reduces weakening of the adhesive bond in use, e.g., under conditions of high temperature or mechanical stress or in the presence of solvents or other chemicals.
5. capability of being easily dried to a very low volatile content - because the adhesive bonds are made with heat, and often between two impervious surfaces, it is desirable that the adhesive contain a low level of volatiles to avoid blistering upon heat-bonding and thermosetting.

The bonded and thermoset products of the instant linear polymers, furthermore, have excellent high peel adhesion to metal, polymeric and other surfaces and have high temperature stability.

In preparing the linear, thermosetting polyimide adhesives of the invention, the benzophenone tetracarboxylic dianhydride is reacted with an equimolar amount of the diamine to form a linear polyamic acid. The polyamic acid, without isolation, is then chemically converted to the polyimide form through the use of acetic anhydride and pyridine or other dehydrating agents known to the art. The polyimide which is formed is isolated and then dissolved in cresol or in solvent blends which contain cresol and aromatic hydrocarbons and/or chlorinated solvents, provided, however, that the solvent contains at least 40 percent by weight of cresol (preferably m-cresol although o-cresol and p-cresol may also be used. A mixture of m-cresol and p-cresol, which is commercially available, is particularly convenient and is often used. Among the suitable aromatic hydrocarbons are benzene, toluene and xylene. The suitable chlorinated solvents include methylene chloride, trichloroethylene, carbon tetrachloride, etc. The solution may contain up to about 30% by weight of the polyimide. The solution of the polyimide can then be easily cast into a film, if desired, and dried easily without thermosetting the polymer. Thus, a dry film of the polymer is obtained which may be used in a bonding application immediately or stored for later use without any loss in adhesive properties.

The following examples will more particularly define the invention:

EXAMPLE 1

Hexamethylene diamine (81.6 g., 0.7 mole) was dissolved in dry dimethylacetamide (1500 cc) in a 2-liter reaction flask fitted with a thermometer, stirrer and viscometer tube. A quantity of benzophenone tetracarboxylic dianhydride (0.66 mole) was added to the solution containing the hexamethylene diamine and then another quantity of benzophenone tetracarboxylic dianhydride was added in small increments until a maximum viscosity was attained. The total amount of benzophenone tetracarboxylic dianhydride in the reaction flask was not more than a 0.5% molar excess over the equivalent amount of hexamethylene diamine. The inherent viscosity of this polyamide acid, as measured from a 0.5% solution of the acid in m-cresol at 25° C. was 0.56. The polyamic acid was then chemically converted to the polyimide structure by adding pyridine (1,000 cc) and acetic anhydride (500 cc) to the polyamic acid solution and heating the entirety to about 85° C. for 1 hour. As a result, polyimide solids were formed which could be isolated by filtration. The solids were then washed with acetone and dried. The inherent viscosity of the polyimide, as measured from a 0.5% solution in m-cresol at 25° C., was 0.60. The polyimide solids were then dissolved in m-cresol to form a 20% solids solution. This solution was then cast into a tack-free film and evaluated as an adhesive as will be described later.

EXAMPLE 2

Nonamethylene diamine (3.1479 g., 0.0199 mole) was weighed into an 8 oz. jar and dissolved in dry dimethylacetamide (91.8 cc). Benzophenone tetracarboxylic dianhydride (6.412 g., 0.0199 mole) was weighed into a plastic boat which was floated on the solution containing the nonamethylene diamine and the jar was subsequently sealed. The jar was then placed on a mechanical shaker. The shaking upset the plastic boat which allowed the benzophenone tetracarboxylic dianhydride to react with the nonamethylene diamine. The jar was left on the shaker for several hours. The resulting polyamic acid solution was imidized by adding approximately 95 cc of pyridine and approximately 45 cc of acetic anhydride and heating the entirety at 60–80°

C. for 1 hour. The polyimide was isolated by filtration and found to have an inherent viscosity of 0.37, as measured from a 0.5% solution in m-cresol at 25° C. The polyimide solids were dissolved in m-cresol to form a 20% solids solution. This solution was then cast into a tack-free film and evaluated as an adhesive as will be described later.

EXAMPLE 3

Octamethylene diamine and benzophenone tetracarboxylic dianhydride were reacted to form a linear polyimide structure using the same technique as described in Example 2. The resulting polyimide had an inherent viscosity of 0.33 as measured from a 0.5% solution of the polyimide in m-cresol at 25° C.

EXAMPLE 4

Benzophenone tetracarboxylic dianhydride and 1,3-diaminopropane were reacted to form a linear polyimide using the technique of Example 2. The resulting polyimide had an inherent viscosity of 0.21 as measured from a 0.5% solution of the polyimide in m-cresol at 25° C.

EXAMPLE 5

Benzophenone tetracarboxylic dianhydride and 1,4-bis(aminomethyl)cyclohexane were reacted according to the technique of Example 2 to form a linear polyimide structure. The resulting polyimide had an inherent viscosity of 0.42 as measured from a 0.5% solution of the polyimide in m-cresol at 25° C.

The linear polyimides of Examples 1–5 were all fusible and thermosetting, had an inherent viscosity between 0.1 and 2.0 (as measured from a 0.5% solution of polyimide in m-cresol at 25° C.), exhibited softening points between 150° C. and 300° C., were substantially completely soluble in m-cresol at 25° C. in the ratio of 10% by weight of polymer to 90% by weight of solvent, and released not more than 1% by weight of volatiles upon being heated for a period of 10 hours at 200° C. and thereby rendered thermally set. The infrared analyses of the polymers of Examples 1–5 confirmed that the polymers were linear polyimides.

Dodecamethylene diamine and benzophenone tetracarboxylic dianhydride can also be reacted in the same way to form a linear polyimide structure according to the invention.

Thermal data for the polyimide systems of the examples is given in the following table:

| Example No. | (a) Tg (°C.) | (b) Tm (°C.) | Weight Loss by TGA (c) 10% | 50% |
|---|---|---|---|---|
| 1 | 138–147 | 250 | 460 | 493 |
| 2 | 93–100 | 160 | 443 | 481 |
| 3 | 99–110 | 180 | 455 | 543 |
| 4 | 170–178 | about 300 | 455 | 543 |
| 5 | 137–156 | | 459 | 490 | a. Glass transition temperatures as determined by Differential Thermal Analysis (DTA) in an atmosphere of helium at 740 mm. pressure at a temperature rise of 30° C./minute.
b. Melting point as determined by Differential Thermal Analysis (DTA) using the same conditions as in (a).
c. Determined by Thermogravimetric Analysis in air at a temperature rise of 5° C./minute.

The linear polyimide of Example 1 (a reaction product of benzophenone tetracarboxylic dianhydride and hexamethylene diamine) was dissolved in m-cresol cast as a film and heated for 2 hours at 200° C. At the end of that time the film could no longer be dissolved completely in m-cresol thus indicating thermosetting characteristics. Thermosetting was also shown by increasing high temperature strength of lapped Kapton joints (Kapton is the trade designation for an infusible polyimide film available commercially from the E. I. DuPont Company) as follows: A 6 mm × 8.5 mm lap joint of Kapton (force applied in the 8.5 mm direction) bonded with the polymer of Example 1 was tested. The results are summarized in the following table.

| Cure time at 260° C. | Lap joint failure at 350° C. with 147 g. of applied force |
|---|---|
| None | Failed immediately |
| 12 minutes | Failed in 0.15 minutes |
| 30 minutes | Failed in 0.9 minutes |
| 45 minutes | Bond did not fail at 350° C. |
| 120 minutes | Bond did not fail at 350° C. |

Adhesive films of all of the above-prepared polyimides were made by casting the polyimide solution onto a substrate which is to be laminated and then drying to a tackfree film coating containing not more than about 1% of residual solvent by weight. The substrate with the adhesive film coating could then be laminated to another substrate such as metal or organic polymeric film by one of several methods. For example, the substrate with the polyimide adhesive coating thereon may be heated to its approximate softening point (160° C. – 300° C., depending on the number of carbon atoms in the diamine used to form the polyimide) and then placed against the substrate to which it is desired to bond. Alternatively, one may place the two substrates together with the adhesive film between them and then heat one or both substrates to the approximate softening point of the adhesive. Very little pressure is required in making such an adhesive bond (i.e., often less than about 10 p.s.i. is required). After the bond is made the adhesive may be thermally cured to yield a thermoset bond having high strength and high temperature resistance.

As a further alternative, a self-supporting polyimide film may be prepared by casting the polyimide solution on a release substrate so that, after drying the polyimide, the film may be removed from the release substrate. Also, the polyimide solution may be cast over, or saturated through, a glass cloth or other similar substrate which would act as a carrier for the adhesive after drying of the solution.

The thermoset adhesive bonds may be conveniently evaluated utilizing the following "Bar Peel Test" procedure:

A 2-mil film of an infusible polyimide (available from the E. I. DuPont Company under the trade designation Kapton) is laminated to 1 oz. copper film using the individual polyimide adhesives of the invention. The bonds are made at about 235° C. and less than 10 p.s.i. for approximately 5 seconds. Then, one-half inch wide samples of this Kapton-copper laminate are cut for testing in a "Bar Peel Test."

The Bar Peel Test provides a simple method of testing the peel adhesion of Kapton-copper laminates made with the polyimide adhesives of the present invention. The test comprises, generally, fastening the Kapton film portion of the laminate to a flat steel bar and then drawing back the copper portion of the laminate at an angle of 180° and at a rate of 5 inches/minute jaw separation in an Instron test machine. A value is obtained in pounds/inch of width. This value is designated as the peel adhesion of the respective polyimide adhesive. The test is carried out at room temperature with the adhesive bonds also at room temperature. This procedure conforms to ASTM procedure D 903-49 except for the slightly different rate of jaw separation and for the different test machine.

The Bar Peel Test data is as follows:

| Laminate | Adhesive Thickness | Pounds/inch Width |
|---|---|---|
| 3 mil Kapton polyimide of Example 1 1 oz. copper | 2.0 mils | 9–10 |
| 2 mil Kapton polyimide of Example 1 1 oz. copper | 2.0 mils | 9–11 |
| 2 mil Kapton polyimide of Example 2 1 oz. copper | 2.0 mils | 8–9 |
| 2 mil Kapton polyimide of Example 3 1 oz. copper | 2.0 mils | 8 |
| 2 mil Kapton polyimide of Example 5 1 oz. copper | 2.0 mils | 6–7 |

Various additives may be utilized with the polymers of the invention, if desired, such as fillers and coloring pigments and the polymers can be molded, cast, calendered, extruded and otherwise handled using known techniques.

What is claimed is:

1. A solid, tack-free linear, fusible, thermosetable polyimide of benzophenone tetracarboxylic dianhydride and a saturated aliphatic diamine having from three to 12 carbon atoms, containing not more than a 2% excess of either the dianhydride or diamine over the amount needed to form the linear polyimide, the polyimide having
   a. an inherent viscosity of about 0.1 to about 2.0 as measured from a 0.5% solution in m-cresol at 25° C.,
   b. a softening point of from about 150° C. to about 300° C. as determined by differential thermal analysis in an atmosphere of helium at 740 mm. pressure at a temperature rise of 30° C./minute,
   c. substantially complete solubility in m-cresol at 25° C. in the ratio of 10% by weight of polymer to 90% by weight of solvent, said linear polyimide releasing not more than 1% by weight of volatiles upon being heated for a period of 10 hours at 200° C. and thereby rendered thermally set.

2. The polyimide of claim 1, wherein said diamine is hexamethylene diamine.

3. A dry, fusible powder comprising a polyimide of claim 1.

4. An adhesive comprising a polyimide of claim 1.

5. A polyimide according to claim 1 in film form.

6. A solution of
   1. not more than about 30 parts by weight of a linear, fusible, thermosetable polyimide of benzophenone tetracarboxylic dianhydride and a saturated aliphatic diamine having from 3 to 12 carbon atoms, containing not more than a 2% excess of either the dianhydride or diamine over the amount needed to form the linear polyimide, the polyimide having
      a. an inherent viscosity of about 0.1 to about 2.0 as measured from a 0.5% solution in m-cresol at 25° C.,
      b. a softening point of from about 150° C. to about 300° C. as determined by differential thermal analysis in an atmosphere of helium at 740 mm. pressure at a temperature rise of 30° C./minute,
      c. substantially complete solubility in m-cresol at 25° C. in the ratio of 10% by weight of polymer to 90% by weight of solvent,
   said linear polyimide releasing not more than 1% by weight of volatiles upon being heated for a period of 10 hours at 200° C. and thereby rendered thermally set; and
   2. at least 70 parts by weight of a solvent therefor which contains at least 40% by weight of cresol and the remainder, if any, is selected from chlorinated hydrocarbons and aromatic hydrocarbons,
provided that the total of (1) and (2) is 100 parts.

7. A solution according to claim 6 in which the solvent is m-cresol.

8. A solution according to claim 6 in which the solvent is a mixture of m-cresol and p-cresol.

* * * * *